US010000363B2

(12) United States Patent
Anderson et al.

(10) Patent No.: US 10,000,363 B2
(45) Date of Patent: Jun. 19, 2018

(54) PIPE FLANGE LIFTING APPARATUS

(71) Applicant: Worldwide Machining & Welding, Inc., Superior, WI (US)

(72) Inventors: John Anderson, Hawthorne, WI (US); Tom Gralewski, Superior, WI (US)

(73) Assignee: Worldwide Machining & Welding, Inc., Superior, WI (US)

( * ) Notice: Subject to any disclaimer, the term of this patent is extended or adjusted under 35 U.S.C. 154(b) by 343 days.

(21) Appl. No.: 14/832,301

(22) Filed: Aug. 21, 2015

(65) Prior Publication Data

US 2016/0052750 A1 Feb. 25, 2016

Related U.S. Application Data

(60) Provisional application No. 62/040,189, filed on Aug. 21, 2014.

(51) Int. Cl.
*B23P 15/00* (2006.01)
*B66C 1/10* (2006.01)

(52) U.S. Cl.
CPC .................................... *B66C 1/10* (2013.01)

(58) Field of Classification Search
CPC ......... B23P 11/00; B23P 11/005; B23P 17/00; B23P 19/00; B23P 19/10
See application file for complete search history.

(56) References Cited

U.S. PATENT DOCUMENTS

| | | | | |
|---|---|---|---|---|
| 4,031,603 A * | 6/1977 | Shultz | B25B 27/304 | 29/259 |
| 4,778,211 A * | 10/1988 | Gabriel | E02F 3/02 | 294/115 |
| 5,435,411 A * | 7/1995 | Borgatti | B23D 47/025 | 144/287 |
| 6,266,859 B1 * | 7/2001 | Hernandez | B25B 27/023 | 29/256 |
| 6,665,919 B1 * | 12/2003 | Kurtz | B25B 27/023 | 269/3 |
| 8,118,293 B1 * | 2/2012 | Barger | B23Q 7/05 | 144/287 |
| 8,434,800 B1 | 5/2013 | LeBlanc | | |
| 8,434,801 B2 | 5/2013 | LeBlanc | | |
| 9,211,635 B2 * | 12/2015 | Poole | B25B 5/166 | |
| 2012/0286119 A1 | 11/2012 | Scott | | |
| 2013/0106124 A1 | 5/2013 | LeBlanc | | |
| 2013/0264835 A1 | 10/2013 | LeBlanc | | |

* cited by examiner

*Primary Examiner* — Lee D Wilson
(74) *Attorney, Agent, or Firm* — Kagan Binder PLLC

(57) ABSTRACT

The invention is directed to a flange lifting apparatus that is configured to have an upper portion that can be attached to a crane or hoist, and a lower portion that can be attached to a flange using flange attachment arms. The lifting apparatus has a support body comprising with first and second ends and an elongate opening in the support body. A movable support member has an upper portion with opening accommodating a threaded rod, and a lower portion attached to a rotatable cam that is positioned within and capable of traveling within the elongate opening of the support body. Rotation of the rod causes movement of the support member which shifts the center of gravity and causes the flange to tilt.

15 Claims, 5 Drawing Sheets

PIPE FLANGE LIFTING APPARATUS

CROSS-REFERENCE TO RELATED APPLICATION

The present non-provisional Application claims the benefit of commonly owned provisional Application having Ser. No. 62/040,189, filed on Aug. 21, 2014, entitled PIPE FLANGE LIFTING APPARATUS, which Application is incorporated herein by reference in its entirety.

BACKGROUND

The construction and maintenance of pipeline systems, such as those used for the transport of large volumes of petrochemicals, typically involves moving of many segments of pipeline that are very heavy. These heavy pipeline pieces often require use of heavy machinery, such as a hoist or crane, capable of mechanically lifting the pieces for installation or removal.

Pipeline flanges are examples of heavy pipeline connection components that can be attached to an end of a pipe. The flanges are typically connected either to an end face of a pipe segment, around a peripheral edge of the pipe segment end or within an internal end portion of the pipe segment. These flanges are usually annular and typically have a round peripheral shape and are desirably brought into proper placement at the end of the pipeline where bolt holes in the flange, pipeline and/or an adjacent flange are aligned. While putting the flange into position for attachment to the pipeline segment, it is desirable to provide the best possible alignment to minimize or eliminate the risk of leaking fluid after the flange has been attached to the pipeline.

Traditional attachment methods can be time consuming and inaccurate. They may also not provide a desired level of safety. For example, in one traditional approach a metal piece is welded to the flange, which serves to provide a loop or eye for attachment to a hoist strap or chain of a crane. The welding of the attachment piece and its removal adds a considerable amount of time to the installation process, and moreover does not necessary provide desired maneuverability during installation. Another traditional approach is to place a hoist strap or chain through a flange bolt hole. This, however, is not a particularly safe procedure and there is risk the hoist strap or chain may break. Further, the strap or the chain must also be removed from the bolt hole prior to placing and securing the flange to the pipeline with bolts. This method also does not provide desired maneuverability during installation. In traditional hoisting procedures the flange may also move in unwanted directions during the installation process, thus making installation difficult.

Another concern regarding traditional flange lifting apparatus is that the heavy weight of the flanges may cause parts of the lifting apparatus to bend or warp. Pieces of the lifting apparatus could be damage or destroyed. If this happens, the installation process could be compromised, resulting in a faulty installation.

SUMMARY OF INVENTION

The invention provides a pipe flange lifting apparatus, a lifting apparatus/flange assembly, and methods for maneuvering a flange, such as a method for attaching a flange on a portion of a pipeline. The flange lifting apparatus is particularly useful for hoisting and maneuvering heavy pipeline flanges, and allows the flanges to be installed on a pipeline with greater accuracy and safety. The pipe flange lifting apparatus includes a movable support member that can be moved along a rod having threads when the rod is rotated. Movement of the support member shifts the center of gravity and causes the flange to tilt. The ability to tilt and maneuver the flange can facilitate installation of the flange on a pipeline. The configuration of lifting apparatus prevents warping and bending of apparatus parts while advantageously providing improved maneuverability during a flange installation process.

In one embodiment, the invention provides a flange lifting apparatus that has a support body comprising first and second ends and guide structure extending at least partially between the first and second ends of the support body; and a movable support member operatively connected with the support body by a linear drive mechanism, the linear drive mechanism oriented to move the movable support member in an axial direction of the linear drive mechanism and along the guide structure of the support body, wherein a first portion of the movable support member is configured for attachment to a hoist attachment member, and a second portion of the movable support member includes a guide element that is positioned so as to be capable of traveling along the guide structure of the support body, wherein the apparatus is configured so that controlled drive of the linear drive mechanism can selectively position the movable support member between the first and second ends, and further wherein, a portion of the support body is configured for attachment to a flange.

In more specific embodiments, the pipe flange lifting apparatus can have a support body comprising first and second ends; an elongate opening in the support body extending at least partially between the first and second ends; first and second projections extending from a horizontal section that extends between the first and second ends of the support body, the first and second projections defining a recess in a portion of the support body; bearing openings in the first and second upper projections for supporting and within which a threaded rod is disposed, the rod defining a first axis of the apparatus; a drive element for causing rotation of the threaded rod; and a lower portion configured for attachment to one or more flange attachment arms, wherein the flange lifting apparatus further comprises a movable support member comprising a first portion including an opening through which the rotatable rod is disposed and configured for attachment to a hoist attachment member, and a second portion attached to a rotatable roller that is positioned within and capable of traveling within the elongate opening of the support body, wherein the apparatus is configured so rotation of the threaded rod is capable of causing movement of the movable support member along the first axis, within the recess, and between the first and second upper projections.

In another embodiment, the invention provides an assembly comprising a flange attached to the flange lifting apparatus via one or more flange attachment arms.

In yet another embodiment, the invention provides a method of maneuvering a flange. In the method, an assembly comprising a flange attached to the lifting apparatus is provided, and then the flange is maneuvered. The method can include a step of moving the movable support member to tilt the flange that is attached to the apparatus. The flange, attached to lifting apparatus, can be hoisted by a suitable device such as a crane.

In a related embodiment, the invention provides a method for installing a flange on a pipeline. In the method, an assembly comprising a flange attached to the lifting apparatus is provided, and then the flange is secured to the pipeline. In more specific aspects, the method can include one or more of the following steps: moving the movable support member to tilt the flange that is attached to the apparatus; and/or providing the flange attached to the lifting apparatus using flange attachment arms, wherein bolt hole rods are placed through holes in the lower portion of the attachment arms and bolt holes in the flange.

DETAILED DESCRIPTION

Figure 1:
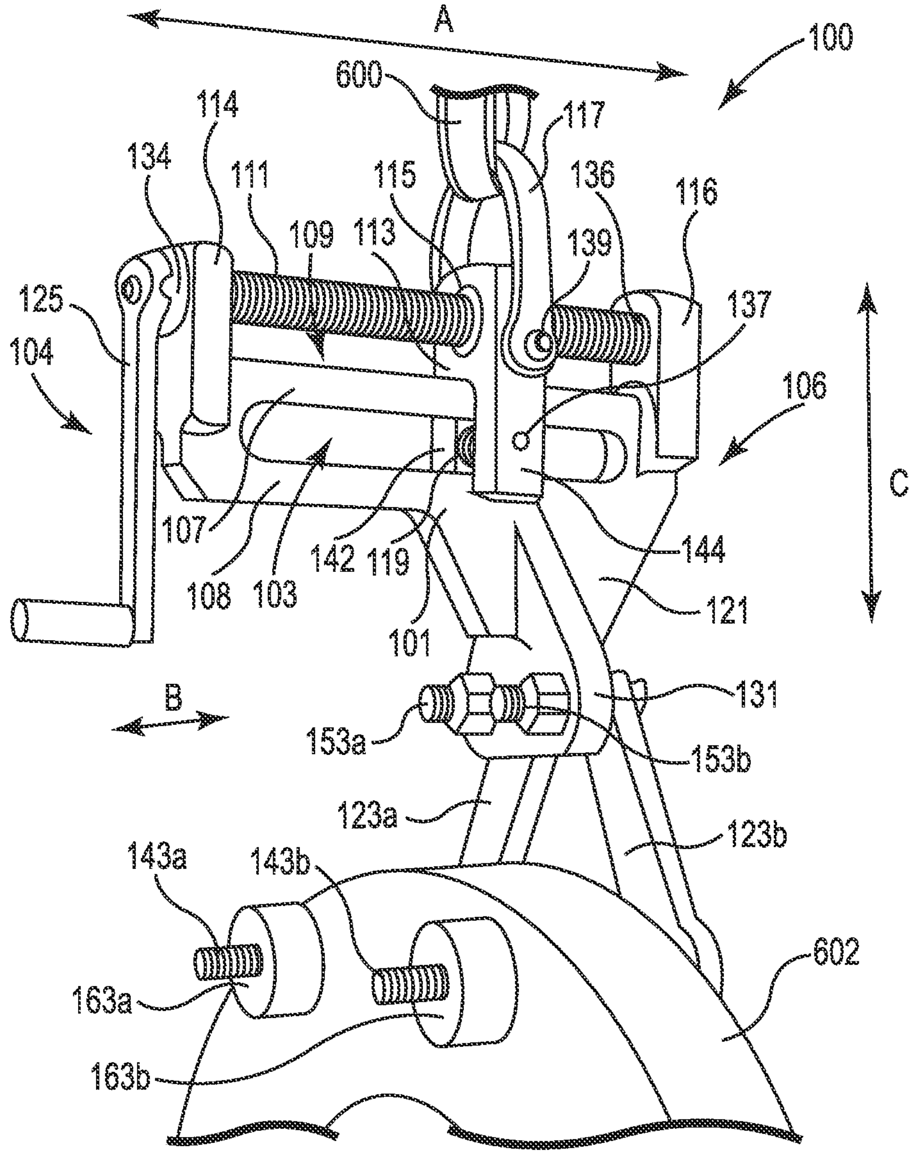
FIG. 1 is a perspective view of a flange lifting apparatus of the disclosure attached to a pipe flange.

Embodiments of the present invention described herein are not intended to be exhaustive or to limit the invention to the precise forms disclosed in the following detailed description. Rather, embodiments are chosen and described so that others skilled in the art can appreciate and understand the principles and practices of the present invention.

Embodiments of the invention include, but are not limited to, pipe flange lifting apparatuses, portions thereof, assemblies of the lifting apparatus and flange, as illustrated in FIGS. 1-5, as well as methods for using these items. A flange, as used within this specification, can be any element that when secured to a pipe segment, either directly or indirectly by another flange or other element, provides for creating a connection point between pipe segments. In this regard, a flange is connectable with a pipe segment, which connection can be done at a pipe segment edge, outer end surface, or inner end surface. A flange can be only a connection portion, such as an annular component with one or more connector openings, or can also include a pipe portion that could be complimentary with an external or internal surface of a pipe segment to which the flange is to be attached. Such flanges can be annular for connecting circular pipe segments, or any other shape that can be similar or dissimilar to the cross-sectional shape of the pipe segments.

As a general matter, the flange lifting apparatus can be used in a process for maneuvering a flange, or installing a flange on a pipeline. In use, the lifting apparatus can be positioned between, or attached to, a part of a crane or hoist, such as a hoist cable, strap, or chain, and a flange. For example, an upper portion of the lifting apparatus can be attached to a crane strap, and the lower portion of the lifting apparatus can be attached to a flange. The lifting apparatus can be attached to the flange using one or more flange attachment arms.

In order to explain aspects of the lifting apparatus and assembly with a flange, the terms "upper" and "lower" can be used to indicate the position of components or features of the apparatus when it is in a working arrangement. A "working arrangement" can be when the when the lifting apparatus is attached to a part of a crane or hoist. For example, the part of the lifting apparatus attached to the hoist will reflect the "upper" portion(s) of the lifting apparatus, whereas the part of the lifting apparatus attached to the flange will reflect the "lower" portion(s) of the lifting apparatus. Similarity, the terms "above" or "below" may also be used to indicate the position of components or features of the lifting apparatus in relation to one another, when the lifting apparatus is in a working arrangement.

The terms "vertical," "horizontal," and "level" may also be used to indicate the position of components or features of the lifting apparatus when it is in a working arrangement. For example, an component of the lifting apparatus is in a "horizontal" position is parallel with the horizon, and one in a "vertical" position is one perpendicular with the horizon.

The apparatus can be formed from materials having high strength and durability to withstand forces associated with the lifting and maneuvering of pipeline flanges. The lifting apparatus can be formed by methods including casting, forging, machining, and welding, or combinations of such methods. One or more portions of the lifting apparatus can be made from single pieces of stock materials that are machined, casted, or forged, or combination of these processes, to desired shapes, sizes, and configurations. Portions of the lifting apparatus can be made from any suitable stock material, such as stainless steel, carbon steel, alloy steel, or other suitable material. These pieces can then be welded together as desired to provide a larger portion of the apparatus. Commercially available components, including one or more bolts, nuts, rods, including fully or partially threaded rods, washers, bearings, arms, including ratchet arms, cams, and handles, can be included in embodiments of the lifting apparatus. Details of commercially available components or components otherwise known in the art are incorporated into the disclosure by reference.

FIG. 1 shows an exemplary flange lifting apparatus 100 with a support body 101. Features of the apparatus can be explained with reference to one or more of the following: first 104 and second 106 ends of the support body; upper (i.e., towards the hoist strap 600) and lower (i.e., towards the flange 602) portions of the support body 101; and the length (arrow A), width (arrow B), and height (arrow C), of the support body 101. The illustrated apparatus is generally elongate in configuration, for example, as reflected by the support body being longer along axis A (length) than axis B (width).

In a central section of the support body 101, there is preferably an elongate opening 103 extending at least partially between the first 104 and second 106 ends. The elongate opening 103 can be sized to accommodate a rotatable roller 119 that is preferably positioned within the opening 103. Rotatable roller 119 can be laterally secured by two lower arms 142, 144 of a lower portion of a movable support member 113, described below, so that it is guided to travel along and within the elongate opening 103. The ends of the elongate opening 103 can have a semicircular shape and a size approximately the diameter of the rotatable roller 119, as illustrated. The ends of the elongate opening 103 can define the limits for travel of the rotatable roller 119 within the opening 103. Exemplary lengths of an elongate opening 103 can be in the range of about 27 cm to about 41 cm, exemplary heights of the elongate opening can be in the range of about 4 to about 6 cm, and exemplary widths of the elongate opening can be in the range of about 2 cm to about 4 cm. The elongate opening 103 of the illustrated support body 101 is defined by an upper horizontal section 107 and lower horizontal section 108 that comprise portions of the support body 101 and that extend at least partially between the first end 104 and the second end 106.

The elongate opening 103 creates a guide structure to the support body 101 for the movable support member 113. This guide structure can not only define the path of movement of the movable support member 113, but can also define the limits of its motion. It is contemplated that the elongate opening 103 can otherwise be provided by other guide structure to the support body 101. For example, external guide elements could be provided extending similarly at least partially between the first end 104 and the second end 106. Instead of having a single roller 119 follow within the guide slot or elongate opening 103, one or more rollers can be positioned to both sides of the support body 101 to engage and follow guide rails (not shown) provided along the sides of the support body 101. Non-roller slidable elements are also contemplated instead of rollers for being guided by any guide slot, guide rails, or similar features. Alternatively, the movable support member 113 could be provided with slide portions that merely slide along a side surface or other guide structural surfaces of the support body 101. That is to say that guide structure does not require additional structure, but includes a complimentary interactions between a portion of the movable support member 113 and the support body 101 such that the movable support member 113 is guided as it is moved relative to the support body 101.

Whether utilizing a slot guide or a rail guide, or the like, for the present invention, it is preferable to at least provide a guide surface for engaging an upper portion of any one or more rollers or slide elements so as to provide vertical support to a flange 602 as such flange 602 is hung with respect to a hoist strap 600 or the like. In the illustrated embodiment, the upper slot defining surface above the roller 119 engages with the roller 119 in the illustrated dynamics with the flange 602 hung from the flange lifting apparatus 100. A lower slot defining surface below the roller 119 is spaced sufficiently from the upper slot defining surface so as to permit the roller 119 to freely move along the upper slot defining surface, but to preferably maintain the roller 119 within the guide slot elongate opening 103.

It is further contemplated that the movable support member 113 can be moved relative to the support body 101 without guidance by any guide structure of the support body 101. As discussed below, a linear drive mechanism can provide drive functionality to the movable support member 113 but can also provide sufficient guidance to the movable support member 113 without other guide structure. A benefit of having guidance structure in addition to the linear drive mechanism is the distribution of hanging flange weight potentially to both the guide structure and linear drive structure. Moreover, with the combination of a linear drive mechanism and guide structure, rotation of the support body 101 about the linear drive axis is prevented.

According to the illustrated embodiment of FIG. 1, at the first 104 and second 106 ends of the support body are first and second upper projections 114, 116 which generally extend upward of at least a portion of the height of the support body 101. The first and second upper projections 114, 116 can have a width greater than their length. Exemplary length, width, and height of the upper projections can be in the range of about 2 cm to about 4 cm, about 6 cm to about 10 cm, and about 10 to about 17 cm, respectively. In some arrangements, the first and second upper projections can be metal pieces that are welded to each end of the upper horizontal section 107 of the support body. As a general matter, the first and second upper projections 114, 116 can preferably define a recess 109 in the upper portion of the support body, with the movable support member 113 positioned and movable within this recess 109.

A lead screw arrangement can be provided as a linear drive mechanism for moving the movable support member 113 relative to the support body 101, and in particular within the recess 109 defined by the first and second projections 114, 116. Specifically, openings 134, 136 can be present in the first and second upper projections 114, 116 respectively. Rod 111 preferably is a lead screw element that extends in a longitudinal direction and that is rotatable about its longitudinal axis. The rod 111 preferably comprises a threaded portion between end portions that can be disposed at least partially within the openings 134, 136. End portions of the rod 111 can terminate within the openings 134, 136 in the upper projections 114, 116 or can terminate outside of the openings 134, 136. The rod 111 is preferably supported by bearing surfaces defining the openings 134, 136 to be allowed to rotate freely with the openings 134, 136 in the first and second upper projections 114, 116. The rod 111 is also preferably axially fixed to one or both of the projections 114, 116 so that rotation of the rod does not cause axial movement of the rod 111 relative to the support body 101. In this regard, linear drive mechanisms including lead screw assemblies are well known themselves. The end portions of the rod 111 within the openings 134, 136 in the projections 114, 116 can be without threads, but may include one or more features, such as other bearings, to facilitate rotation. In exemplary embodiments, the threaded rod can have a length in the range of about 42 cm to about 63 cm, and a diameter in the range of about 2 cm to about 5 cm. Openings 134, 136 can have a diameter to accommodate the rod 111 and to permit its rotation without axial movement of the rod 111.

At one end of the lifting apparatus (e.g., the first end 104) the rod 111 can be attached directly to or in operative connection with a rotational drive member. The rotational drive member can be actuated either manually or with power assistance. For example, at the first end 104 of the lifting apparatus, the threaded rod 111 can be attached to crank arm 125 comprising a handle. In some embodiments, the crank arm 125 has a ratcheting mechanism (e.g., a ratchet mechanism). Use of a ratchet mechanism can be beneficial in operations where an installer is positioned below the lifting apparatus, as the threaded rod can be rotated without having to move a crank arm in a full circle, which would otherwise be difficult if the height of the threaded rod is beyond arm's reach. Ratcheting drive mechanisms are well known and can be incorporated into a manual rotational drive as conventionally known for controlled drive in one or both rotational directions. The rod 111 can otherwise be driven by a power drive device, such as a servo motor or the like, preferably with a control that allows for forward and reverse drive at desired rotational speeds.

As noted above, the linear drive mechanism of the lifting apparatus 100 includes the movable support member 113. The movable support member comprises a movable or travelling nut of a lead screw mechanism. The movable support member 113 preferably has an upper portion that includes opening 115 through which the rod 111 is disposed. The inner diameter of the opening 115 can include threads which are complimentary to the threads of rod 111, and rotation of rod 111 can therefore cause translation of the movable support member 113 along the length of rod 111. The movable support member 113 can be moved between the inner surfaces of the first and second upper projections 114, 116. Other limiting elements can be provided as desired.

The upper portion of the movable support member 113 can also be attached to a crane hoist attachment member 117. As shown in FIG. 1, the crane hoist attachment member 117 can have a loop or semicircular shape. In use, the crane hoist attachment member 117 can be attached to hoist strap 600, such as provided from a crane. Bolts (e.g., at 139) can be used to secure a lower portion of the attachment member 117 to the movable support member 113. Alternatively, the upper portion of the movable support member 113 can be configured to provide an opening for attachment of a hoist strap from a crane. For example, in an alternative configuration, the movable support member can include a second opening above the opening 115 for such an attachment.

The movable support member 113 can have a lower portion with arms 142, 144 that extend downward. The height of the arms 142, 144 can be a portion of the height of the support member 113, such as about half of the height of the support members 113. The arms 142, 144 preferably define a recess in the lower portion of the support member in which the rotatable roller 119 is positioned. The rotatable roller 119 can be supported using an axle 137 that traverses and is conventionally fixed to the arms 142, 144.

Figure 3:
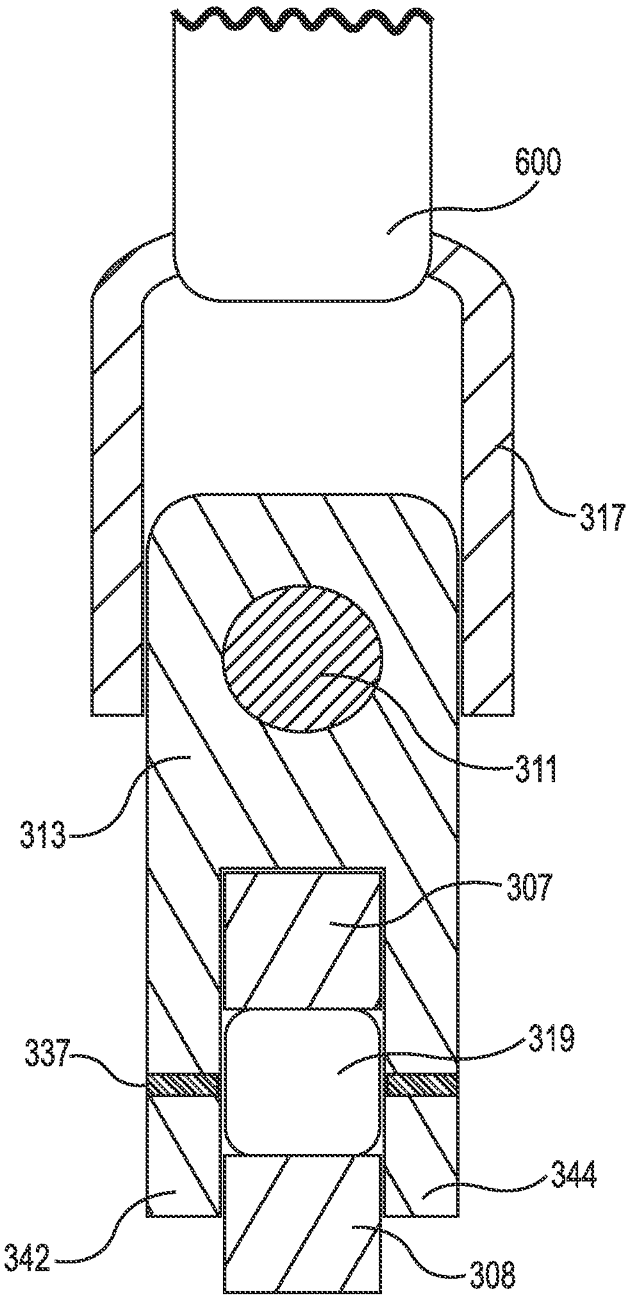
FIG. 3 is a cross-sectional view taken through a portion of the flange lifting apparatus of FIG. 1 showing guidance features of a flange lifting apparatus of the disclosure.

Reference is made to FIG. 3, which shows a cross-section of the lifting apparatus as viewed from either the first 104 or second end 106. Rotatable roller 319 is positioned beneath upper horizontal section 307 of the support body, above lower horizontal section 308 of the support body, and between the inner surfaces of arms 342, 344 of movable support member 313. When an upward force is provided by the hoist strap 600, an upward force is also exerted on the rod 311 as well as the upper portion 307 of the support body via the rotatable roller 319. In combination with the support body configuration, this arrangement advantageously distributes the force applied during a lifting operation and can prevent bending or warping that would otherwise damage the apparatus parts.

The flange lifting apparatus 100 preferably also includes a lower portion configured for attachment, directly or indirectly, to one or more flange attachment arms 123*a* and 123*b*. Referring back to FIG. 1, in one embodiment, the support body 101 has a lower projection 121 that is shown closer to the second end 106 of the apparatus 100 than the first end 104. The positioning of this element as well as others of the support body 101 impacts the balancing aspects of the apparatus 100 as used in a lifting operation, as described below. Lower projection 121 is shown as having a width that is the same as the width of the portion of the support body portion directly above it. In some embodiments, the support body 101 including upper horizontal section 107, lower horizontal section 108, and lower projection 121 can be machined from a single piece of stock metal material.

Figures 5A, 5B, 5C:
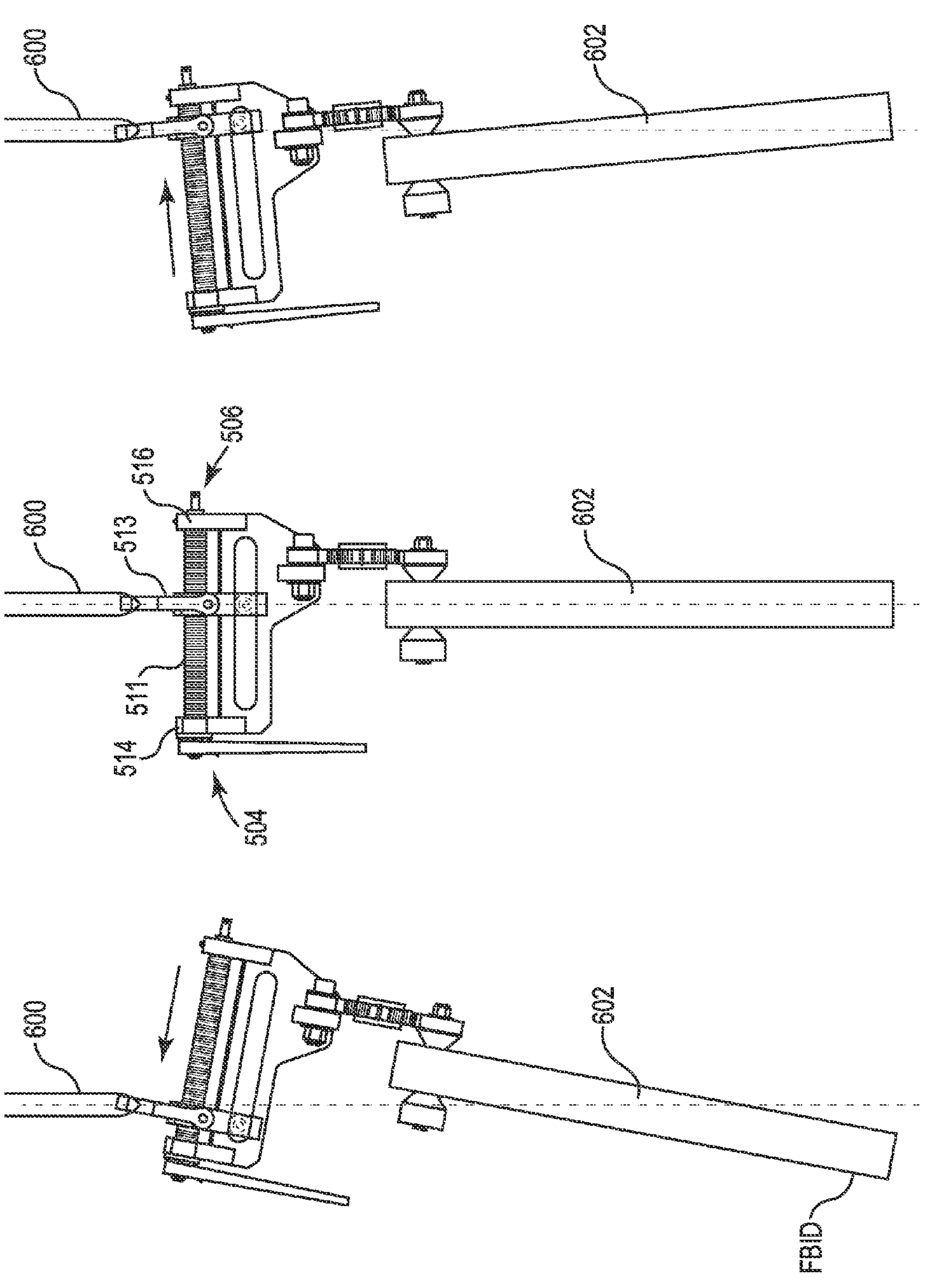
FIGS. 5A-C are side views of a flange lifting apparatus of the disclosure being positioned for attachment to a pipe segment, the flange shown respectively in a first tilt orientation, a level orientation, and a second oppositely tilted orientation.

However, a lower projection 121 can be positioned at any location relative to the first and second ends 104, 106 depending on the design of the apparatus. As shown in FIG. 1, the particular arrangement of features (including the flange attachment arms 123*a*, 123*b* and flange support rods 143*a*, 143*b*), allows the flange 602 to be positioned below an intermediate portion of the apparatus 100 (e.g., at or near the midpoint between the first and second ends 104, 106). FIG. 5*b* also shows this arrangement, wherein the flange 602 is positioned below an intermediate point of the lifting apparatus 100. Therefore, in embodiments, when the flange 602 is attached to the lifting apparatus 100, the center of gravity of the system resulting largely from the weight of the flange 602, can be below the intermediate point of the lifting apparatus (e.g., at a midpoint along length A).

In some embodiments, the lower portion 12 of the apparatus can include a second lower projection 131 that is illustrated as perpendicular to the first lower projection 121. The second lower projection 131 can be welded to a portion of the first lower projection 121. The second lower projection 131 can be wider near its bottom than its top, and can include openings in its lower portion through which bolts 153*a*, 153*b* can be used to attach to flange attachment arms 123*a*, 123*b*.

In one embodiment, a flange 602 can be attached to the lifting apparatus using flange attachment arms 123*a*, 123*b*. The upper ends of the flange attachment arms 123*a*, 123*b* can be attached to a lower portion of the support body 101, such as second lower projection 131. In embodiments, the flange attachment arms 123*a* and 123*b* can pivot on their attachment points (e.g., from bolts 153*a*, 153*b*). When the lower ends of the flange attachment arms 123*a* and 123*b* are not attached to a flange 602, they can pivot freely and be maneuvered to locations to attach to desired bolt holes on the flange 602. More than two such flange attachment arms can be used together. Although only a single such flange attachment arm is required, at least two is preferred.

The lower ends of the flange attachment arms 123*a*, 123*b* can include openings through which flange support rods 143*a*, 143*b* can pass. The flange support rods can extend through bolt holes in the flange 602, and securing nuts 163*a*, 163*b* can be threaded on the support rods to tighten the flange 602 to the flange attachment arms 123*a* and 123*b*.

Figure 2:
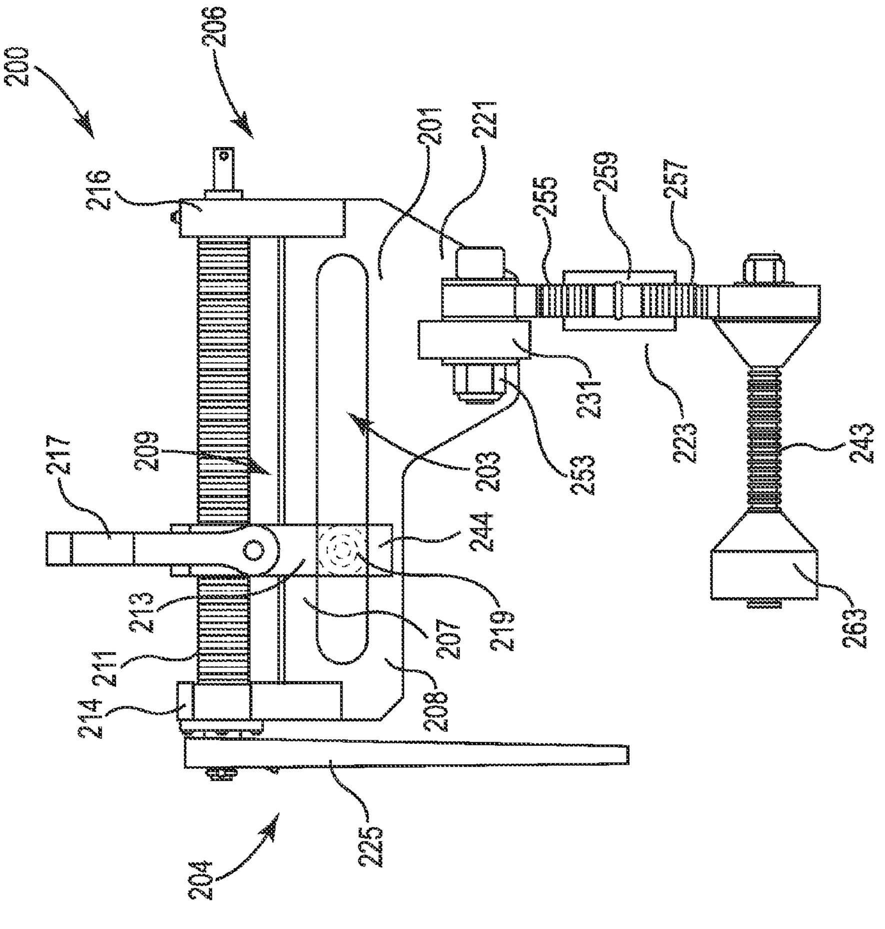
FIG. 2 is a side view of a flange lifting apparatus of the disclosure.

FIG. 2 shows a side view of another embodiment of a lifting apparatus 200 in accordance with the present invention.

Apparatus 200 has a support body 201; first 204 and second 206 ends; elongate opening 203; rotatable cam 219; lower arm 244; first and second upper projections 214, 216, upper horizontal section 207 and lower horizontal section 208 of the support body; recess 209 in the upper portion of the support body; rod 211 comprising threads; crank arm 225; crane hoist attachment member 217; lower projection 221 of support body; flange attachment arm 223, flange support rod 243; and securing nut 263. It is understood, with reference to FIG. 1, that apparatus 200 also can include additional: lower arm, pivotable flange attachment arm, flange support rod, and securing nut, which are hidden in the side view of FIG. 2 by features 244, 223, 243, and 263, respectively.

In the apparatus of FIG. 2, flange attachment arm 223 also includes an adjustable feature to lengthen or shorten the length of the arm. In particular, flange attachment arm 223 includes a proximal threaded rod 255 that is closer to the lower projection 221 of support body, and a distal threaded rod 257 that is closer to flange support rod 243. A coupling member 259 that includes threads on its inside diameter couples rods 255 and 257. Coupling member 259 can be rotated in either rotational direction to adjust the overall length of attachment arm 223. Adjustment of the length can be performed when a flange (not shown) is attached to the arm 223, or prior to attaching the flange to the arm 223.

Figure 4:
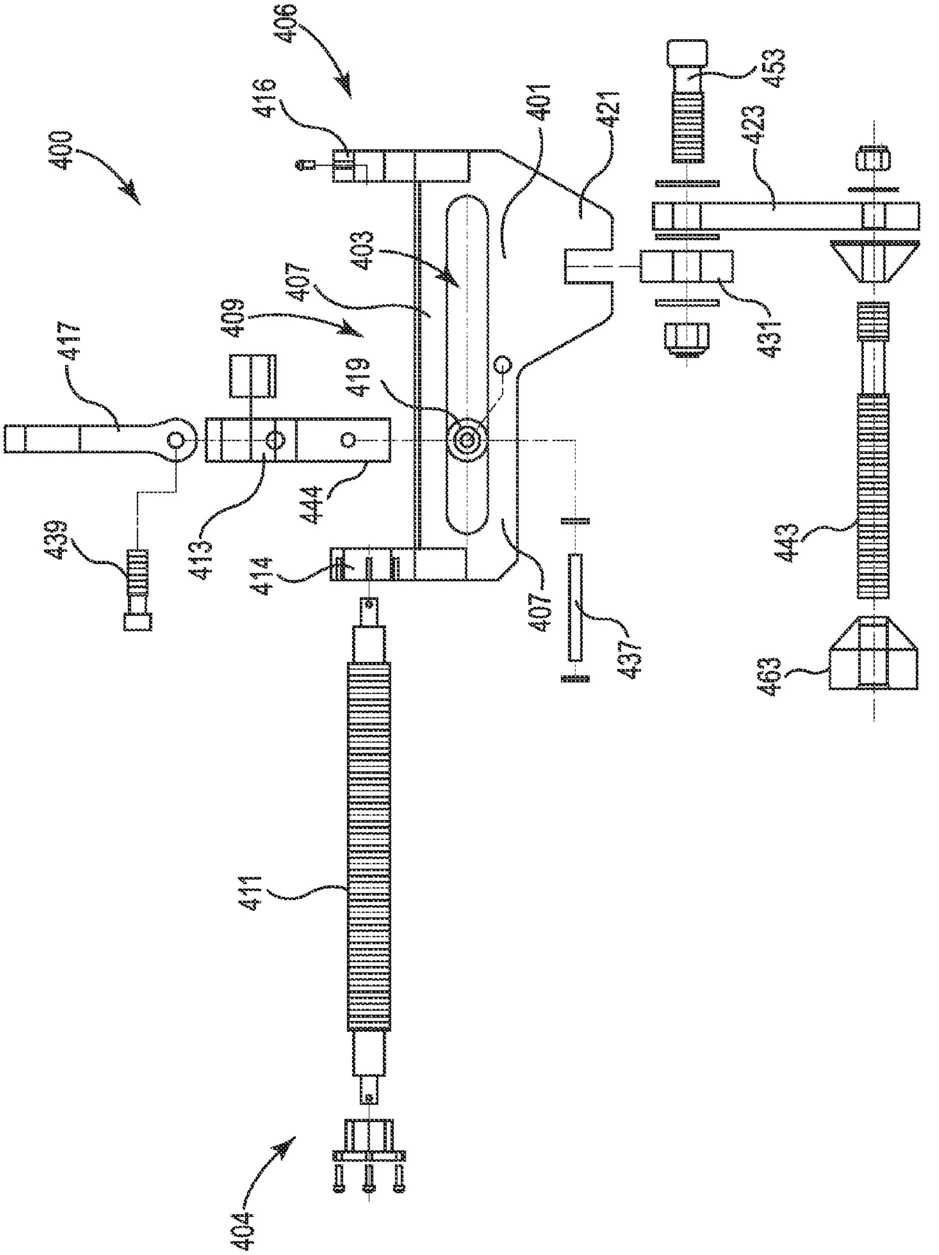
FIG. 4 is an exploded side view of a flange lifting apparatus of the disclosure.

FIG. 4 shows an exploded side view of another embodiment of the lifting apparatus. Apparatus 400 has a support body 401; first 404 and second 406 ends; elongate opening 403; rotatable cam 419; bolt 437; lower arm 444; first and second upper projections 414, 416, upper horizontal section 407 and lower horizontal section 408 of the support body; recess 409 in the upper portion of the support body; rod 411 comprising threads; crane hoist attachment member 417; bolt 439; first lower projection 421 of support body; second lower projection 431 of support body; bolt 453; pivotable flange attachment arm 423, flange support rod 443; securing nut 463. It is understood, with reference from FIG. 1 that the apparatus also includes additional: lower arm, pivotable flange attachment arm, flange support rod, and securing nut.

Flange lifting apparatuses of the present invention can be used in methods for installing a flange on a pipeline, removing a flange from a pipeline, or any other method that involves lifting a flange or similar component. Other methods can include moving a flange from a transporter (e.g., ship, train, truck, etc.) to a stationary position, from one transporter to another, or from one stationary position to another. Methods of moving the flange using the lifting apparatus generally involve using a crane or hoist having a strap, cable, chain, or similar article, attached to the movable support member (e.g., hoist strap 600) of the lifting apparatus. The crane or hoist can raise the lifting apparatus to a desired height, for example, a height that is suitable for attachment of a pipeline flange to the flange attachment arms.

In attaching the pipeline flange to the lifting apparatus, the apparatus can be provided with the flange attachments arms attached to a lower portion of the lifting apparatus. In some embodiments, the flange attachment arms can be pivot from their position on the lower portion of the flange lifting apparatus, and the lower end of the attachment arm can swing to a desired position on the flange. The bolt hole in the flange attachment arm can be aligned with a bolt hole on the pipeline flange. In embodiments where the flange attachment arm includes a mechanism to adjust its length, such as shown in FIG. 2, a coupling member 259 arm can be lengthened or shortened, such as by rotation of the member, to provide desired alignment of bolt holes.

The flange that is attached to the lifting apparatus can have a predetermined weight and the lifting apparatus can therefore have dimensions suitable to support the weight of the flange. That is, lifting apparatus with greater length, width, and height dimensions can be used to lift heavier flanges. In exemplary assemblies, the weight of the flange that is attached to the lifting apparatus is in the range of about 500 lbs. to about 4000 lbs. (about 227 kgs to about 1815 kgs). In some embodiments, the flange has a weight of greater than 500 lbs, a weight of about 1000 lbs (about 453 kgs) or greater, a weight of about 1500 lbs (about 680 kgs) or greater, a weight of about 2000 lbs (about 907 kgs) or greater, a weight of about 2500 lbs (about 1134 kgs) or greater, or a weight of about 3000 lbs (about 1360 kgs) or greater.

After the bolt hole on the attachment arm is aligned with a desired bolt hole on the flange, the flange can be secured to the arm. For example, flange support rods 143*a*, 143*b*, can be moved through aligned bolt holes in the flange attachment arms 123*a*, 123*b* and holes in the flange. Bolts 163*a*, 163*b* can be tightened on the flange support rods to secure the flange to the lifting apparatus.

After the flanged is secured to the lifting apparatus, the flange can be raised using a crane or hoist. In methods for attaching to a pipeline, the flange can be maneuvered to a desired position to facilitate attachment to a pipeline. In modes of practice, and with reference to FIGS. 5A-C, the flange can be tilted from a vertical position using a lifting apparatus of the present invention. As a general matter, the movable support member 513 is moved to a desired position along rod 511 between the first and second upper projections 514, 516 to controllably and predictably cause the flange to be in a vertical position (i.e., non-tilted position), or to cause the top of the flange to be tilted towards the first end of the lifting apparatus 504, or the second end of the lifting apparatus 506.

In a non-tilted position, as shown in FIG. 5B, the movable support member 513 is positioned at an intermediate position along rod 511 so the center of gravity (dashed line) is though the support member 513 and through the entirety of the flange 602, from its top to bottom. In this position, the inner surface of the flange can be maneuvered to be flush with an outer surface of a horizontally-laid pipeline (not shown). When the movable support member 513 is moved to a different position along rod 511 by rotating the rod 511, the center of gravity changes and the top of the flange 602 tilts either towards the first end 504, or towards the second end 506. As shown in FIG. 5A, the movable support member 513 is moved towards the first end 504 causing the top of the flange 602 to tilt towards the second end 506 of the lifting apparatus. As shown in FIG. 5C, the movable support member 513 is moved towards the second end 506 causing the top of the flange 602 to tilt towards the first end 504 of the lifting apparatus. Any desired amount of tilt within the range of movement of the movable support member 513 to the support body 501 in either direction can be achieved by moving the movable support member 513 a desired distance along rod 511.

In some modes of practice, the flange in a tiled position can be brought in contact with the end of a pipeline for assembly. Hoist strap 600 is attached to movable support member 513, and can be maneuvered (e.g., raised, lowered, etc.) via movement of a crane or the like to position a flange as desired. For example, with reference to FIG. 5A, the bottom inner diameter 604 of the flange 602 can be brought into contact with the bottom of a pipeline (not shown). Bolt holes in the flange and the pipeline can be aligned, and then the movable support member 513 is moved towards the second end 506 to tilt the top of the flange up towards the top of the pipeline, rendering the surfaces flush with one another so the mounting process can be completed.

In some modes of practice, the apparatus can be used to mount a flange on a pipeline that is in a non-horizontal position. For example, the pipeline can be on an incline or decline, such as one that is on a hillside. Such a pipeline can have an end having a non-vertical surface. The lifting apparatus which allows the flange to be tilted can be useful in facilitating the mounting the flange on a pipeline on an incline or decline.

What is claimed is:

1. A flange lifting apparatus, comprising:

a support body comprising:

(a) first and second ends;

(b) an elongate opening in the support body extending at least partially between the first and second ends;

(c) first and second projections extending from a horizontal section that extends between the first and second ends of the support body, the first and second projections defining a recess in a portion of the support body;

(d) bearing openings in the first and second upper projections for supporting and within which a threaded rod is disposed, the rod defining a first axis of the apparatus;

(e) a drive element for causing rotation of the threaded rod; and (f) a lower portion configured for attachment to one or more flange attachment arms, the flange lifting apparatus further comprising:

a movable support member comprising (i) a first portion including an opening through which the rotatable rod is disposed and configured for attachment to a hoist attachment member, and (ii) a second portion attached to a rotatable roller that is positioned within and capable of traveling within the elongate opening of the support body, wherein the apparatus is configured so rotation of the threaded rod is capable of causing movement of the movable support member along the first axis, within the recess, and between the first and second upper projections.

2. The apparatus of claim 1 wherein the lower portion of the movable support member comprises first and second arms, wherein the rotatable cam is positioned between the first and second arms.

3. The apparatus of claim 1 wherein the elongate opening in the support body is defined by upper and lower horizontal sections that extend from the first to second end.

4. The apparatus of claims 3 wherein the first and second arms extend from the upper horizontal section to below the elongate opening.

5. The apparatus of claim 1 wherein the lower portion of the support body comprises a first lower projection that extends downward from the support body and is positioned between a midpoint of the support body and the second end.

6. The apparatus of claim 1 wherein the lower portion of the support body comprises a first lower projection having outer, inner, and side surfaces, wherein the side surfaces have a greater surface area than the outer and inner surfaces.

7. The apparatus of claim 5 wherein the lower portion comprises a second lower projection that is perpendicular to the first lower projection.

8. The apparatus of claim 7 wherein the second lower projection has outer, inner, and side surfaces, wherein the inner and outer surfaces have a surface area that is greater than the side surfaces.

9. The apparatus of claim 7 wherein the second lower projection comprises two or more openings configured for attachment to two or more flange attachment arms.

10. The apparatus of claim 1 further comprising two or more flange attachment arms attached to the lower portion of the support body.

11. The apparatus of claim 10 further comprising flange support rods attached to the two or more flange attachment arms.

12. The apparatus of claim 1 wherein the threaded rod is configured to be attached to a crank arm and handle at a first end of the rod.

13. The apparatus of claim 10 wherein the flange attachment arms comprise proximal bolt holes for attachment to the lower portion of the lifting apparatus, and distal bolt holes for attachment to the flange.

14. The apparatus of claim 1 wherein the flange attachment arms comprise an arm lengthening/shortening mechanism.

15. A method of installing a flange on a pipeline, comprising steps of providing a flange lifting apparatus according to claim 1, attaching a flange to the one or more flange attachment arms, rotating the threaded rod to cause movement of the movable support member along the first axis, bringing the flange in contact with the end of a pipeline, and securing the flange to the pipeline.

* * * * *